United States Patent
Ajan et al.

(10) Patent No.: US 7,264,892 B2
(45) Date of Patent: Sep. 4, 2007

(54) MAGNETIC RECORDING MEDIUM AND MAGNETIC STORAGE APPARATUS

(75) Inventors: Antony Ajan, Kawasaki (JP); Akihiro Inomata, Kawasaki (JP); E. Noel Abarra, Santa Clara, CA (US); B. Ramamurthy Acharya, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/936,005

(22) Filed: Sep. 8, 2004

(65) Prior Publication Data

US 2005/0069733 A1    Mar. 31, 2005

(51) Int. Cl.
*G11B 5/66* (2006.01)

(52) U.S. Cl. .................................... 428/831
(58) Field of Classification Search ............... 428/831, 428/828, 900
See application file for complete search history.

(56) References Cited

U.S. PATENT DOCUMENTS

| | | | |
|---|---|---|---|
| 5,685,958 A | 11/1997 | Futamoto et al. | 428/694 TM |
| 5,866,227 A | 2/1999 | Chen et al. | 428/65.3 |
| 6,346,339 B1 | 2/2002 | Harkness et al. | 428/694 TS |
| 6,348,276 B1 | 2/2002 | Chen et al. | 428/694 TS |
| 6,537,684 B1 * | 3/2003 | Doerner et al. | 428/611 |
| 6,602,612 B2 | 8/2003 | Abarra et al. | 428/694 TM |
| 6,645,646 B1 | 11/2003 | Umeda et al. | 428/694 TS |
| 6,689,495 B1 | 2/2004 | Sato et al. | 428/694 TW |
| 6,753,101 B1 | 6/2004 | Abarra et al. | 428/694 |
| 6,821,652 B1 | 11/2004 | Okamoto et al. | 428/694 |
| 6,824,896 B2 * | 11/2004 | Lee et al. | 428/694 TS |
| 6,849,326 B1 * | 2/2005 | Lee et al. | 428/336 |
| 2001/0016272 A1 | 8/2001 | Bian et al. | 428/694 TS |
| 2002/0064691 A1 | 5/2002 | Kanbe et al. | 428/694 TS |
| 2003/0082410 A1 | 5/2003 | Sato et al. | 428/694 |
| 2003/0124390 A1 | 7/2003 | Abarra et al. | 428/695 |

FOREIGN PATENT DOCUMENTS

| | | |
|---|---|---|
| EP | 0772188 A1 | 5/1997 |
| EP | 1 059 629 | 12/2000 |
| JP | 2001-001672 | 1/2001 |
| JP | 2001-056921 | 2/2001 |
| JP | 2002-245610 | 8/2002 |
| JP | 2004-506289 | 2/2004 |
| WO | WO98/48413 | 10/1998 |
| WO | WO99/24973 | 5/1999 |
| WO | WO 02/13190 | 2/2002 |

* cited by examiner

*Primary Examiner*—Holly Rickman
(74) *Attorney, Agent, or Firm*—Greer, Burns & Crain, Ltd

(57) ABSTRACT

A magnetic recording medium includes a substrate, a magnetic recording layer made of a Co alloy or a CoCr alloy, a seed layer disposed between the substrate and the magnetic recording layer, and an underlayer made of a binary alloy material having a B2 structure and disposed between the seed layer and the magnetic recording layer. The seed layer is made of a material comprising essentially of one of elements forming the binary alloy material of the underlayer.

14 Claims, 19 Drawing Sheets

MAGNETIC RECORDING MEDIUM AND MAGNETIC STORAGE APPARATUS

This application claims the benefit of a PCT International Application No.PCT/JP2002/009128 filed Sep. 6, 2002 in the English language, in the Japanese Patent Office, the disclosure of which is hereby incorporated by reference.

The PCT International Application No.PCT/JP2002/009128 was published under International Publication No.WO2004/027762A1 in the English language on Apr. 1, 2004.

BACKGROUND OF THE INVENTION

1. Field of the Invention

The present invention generally relates to magnetic recording media and magnetic storage apparatuses, and more particularly to a magnetic recording medium having a seed layer and an underlayer which is made of a binary alloy, and to a magnetic storage apparatus which uses such a magnetic recording medium.

2. Description of the Related Art

A typical longitudinal magnetic recording medium includes a substrate, a seed layer, a Cr or Cr alloy underlayer, a Co—Cr alloy intermediate layer, a Co alloy magnetic layer where the information is written, a C overlayer, and an organic lubricant which are stacked in this order. Substrates that are presently used include NiP-plated Al—Mg alloy substrates and glass substrates. The glass substrate is more popular due to its resistance to shock, smoothness, hardness, light weight, and minimum flutter especially at a disk edge in the case of a magnetic disk.

Al substrates with electroplated NiP has been widely used for many years for magnetic recording purposes. When grown at high temperatures Ts >150° C., Cr alloy underlayers form a desirable (002) orientation. Sputtered NiP on glass or Al substrate has proven to be as effective in promoting the proper crystallographic orientation of Cr underlayers as disclosed in a U.S. Pat. No. 5,866,227. Therefore, with the same seed layer, existing Al media technology can be used for the subsequent layers. FIGS. 1 through 3 show examples of the layer structure of the conventional magnetic recording media. In FIGS. 1 through 3, those parts which are the same are designated by the same reference numerals.

In a first example shown in FIG. 1, on a glass substrate 1 is formed an amorphous layer 3 made of NiP. The NiP layer 3 is preferably oxidized. On the NiP layer 3 is grown an underlayer made up of two essentially Cr underlayers 4 and 5 with a (002) texture on which a magnetic layer 7 is deposited. The second Cr underlayer 5 usually has a larger lattice parameter than the first Cr underlayer 4.

The magnetic layer 7 has a (11$\bar{2}$0) crystallographic orientation, and may be made up of a single layer or multiple layers that are in direct contact and behave magnetically as one magnetic layer. An interlayer 6 made of a CoCr alloy may be disposed between the magnetic layer 7 and the Cr underlayers 4 and 5. To enhance the adhesion of NiP to glass, elements such as Cr may be alloyed with NiP or a separate adhesive layer 2 made essentially of Cr may be employed. However for metallic substrates like Al, it is not required to employ this adhesive layer 2. On the magnetic layer 7, a protective layer 8 made of C, and an organic lubricant layer 9 are deposited for use with a magnetic transducer such as a spin-valve head.

In a second example shown in FIG. 2, the structure is similar to that of FIG. 1. But in FIG. 2, the magnetic layer 7 is replaced by a plurality of layers 7-a and 7-b that are antiferromagnetically coupled through a spacer layer 10 made of Ru, so as to form a so-called synthetic ferrimagnetic medium (SFM). The first layer 7-a functions as a stabilizing layer, and the second layer 7-b functions as a main recording layer.

A third example shown in FIG. 3 utilizes a refractory metal seed layer 3-a made of Ta-M, where M is either nitrogen or oxygen. On the glass substrate 1 is formed a Ta-M seed layer 3-a either by reactive sputtering with Ar+N$_2$ or Ar+O$_2$ gas on which an underlayer 4 is deposited. The crystallographic orientation of (002) is mentioned in a U.S. Pat. No. 5,685,958, but the composition of the underlayer is limited to Cr or Cr alloy, and no mention is made of underlayers made of materials such as B2 structured materials, for example. The magnetic layer 7 is formed on the interlayer 6 or the underlayer 5 with a (11$\bar{2}$0) preferred orientation as in the first example described above.

The microstructure of the magnetic layer which includes grain size, grain size distribution, preferred orientation and Cr segregation strongly affect recording characteristics of the magnetic recording medium. The microstructure of the magnetic layer is usually controlled by the use of one or more seed layers and one or more underlayers.

Usually, NiP is used as the seed layer on a suitable substrates made of glass or aluminum. Various seed layer materials such as CoCrZr, NiAl and RuAl may be used to obtain in-plane magnetization required for the longitudinal recording. The AlRu seed layer has become more popular due to its influence on the strong texture growth of the subsequent underlayers and magnetic recording layers. Also the AlRu seed layer was found to reduce grain sizes of the subsequent underlayers and the magnetic layers.

AlRu is a B2 structured material in composition ranges of 50% Ru and 50% Al. Though B2 structured AlRu is useful, it is increasingly demanding to search for other composition ranges of AlRu. One way to approach the problem is to sputter deposit from two different targets respectively purely made of Al and Ru in the same chamber, that is, to employ a multicathode system. By varying the power ratios between the two targets, it is easy to study large composition ranges which are otherwise quite expensive using various single alloy targets made of AlRu alloys.

Such a multicathode system offers new ways to search for composition ranges which give the B2 structure of AlRu. However, there can be substantial differences between the film growths when made from single alloy target and from the multicathode system. For example, when AlRu$_{50}$ is used as a single alloy target, it is very easy to form, under normal sputtering parameters, a (001) texture on top of which grows Cr(002) and Co alloy magnetic layer with (11$\bar{2}$0) texture. However, when films are deposited with Al and Ru using the multicathode system, practically it is very difficult to form a good (002) in-plane texture of AlRU$_{50}$.

Accordingly, there are demands to realize alternate structures which can be used to form the (001) texture of AlRu using the multicathode system. In addition, there are also demands to extend the use of the multicathode system to other B2 structured materials which may be used to obtain the preferred (001) texture for the longitudinal magnetic recording medium.

SUMMARY OF THE INVENTION

Accordingly, it is a general object of the present invention to provide a novel and useful magnetic recording medium and magnetic storage apparatus, in which the demands described above are satisfied.

Another and more specific object of the present invention is to provide a magnetic recording medium comprising a substrate; a magnetic recording layer made of a Co alloy or a CoCr alloy; a seed layer disposed between the substrate and the magnetic recording layer; and an underlayer made of a binary alloy material having a B2 structure and disposed between the seed layer and the magnetic recording layer, where the seed layer is made of a material comprising essentially of one of elements forming the binary alloy material of the underlayer. According to the magnetic recording medium of the present invention, it is possible to reduce grain sizes of the underlayer and the magnetic recording layer, and promote desired orientation of the magnetic recording layer. As a result, it is possible to realize a magnetic recording medium having an improved performance.

Still another object of the present invention is to provide a magnetic storage apparatus comprising at least one magnetic recording medium comprising a substrate, a magnetic recording layer made of a Co alloy or a CoCr alloy, a seed layer disposed between the substrate and the magnetic recording layer, and an underlayer made of a binary alloy material having a B2 structure and disposed between the seed layer and the magnetic recording layer, the seed layer being made of a material comprising essentially of one of elements forming the binary alloy material of the underlayer; and a head which writes information on and/or reproduces information from the magnetic recording medium. According to the magnetic storage apparatus of the present invention, it is possible to realize a magnetic storage apparatus having an improved performance, because of the reduced grain sizes of the underlayer and the magnetic recording layer and the promoted desired orientation of the magnetic recording layer of the magnetic recording medium.

Other objects and further features of the present invention will be apparent from the following description when read in conjunction with the accompanying drawings.

DESCRIPTION OF THE PREFERRED EMBODIMENTS

Figure 1:
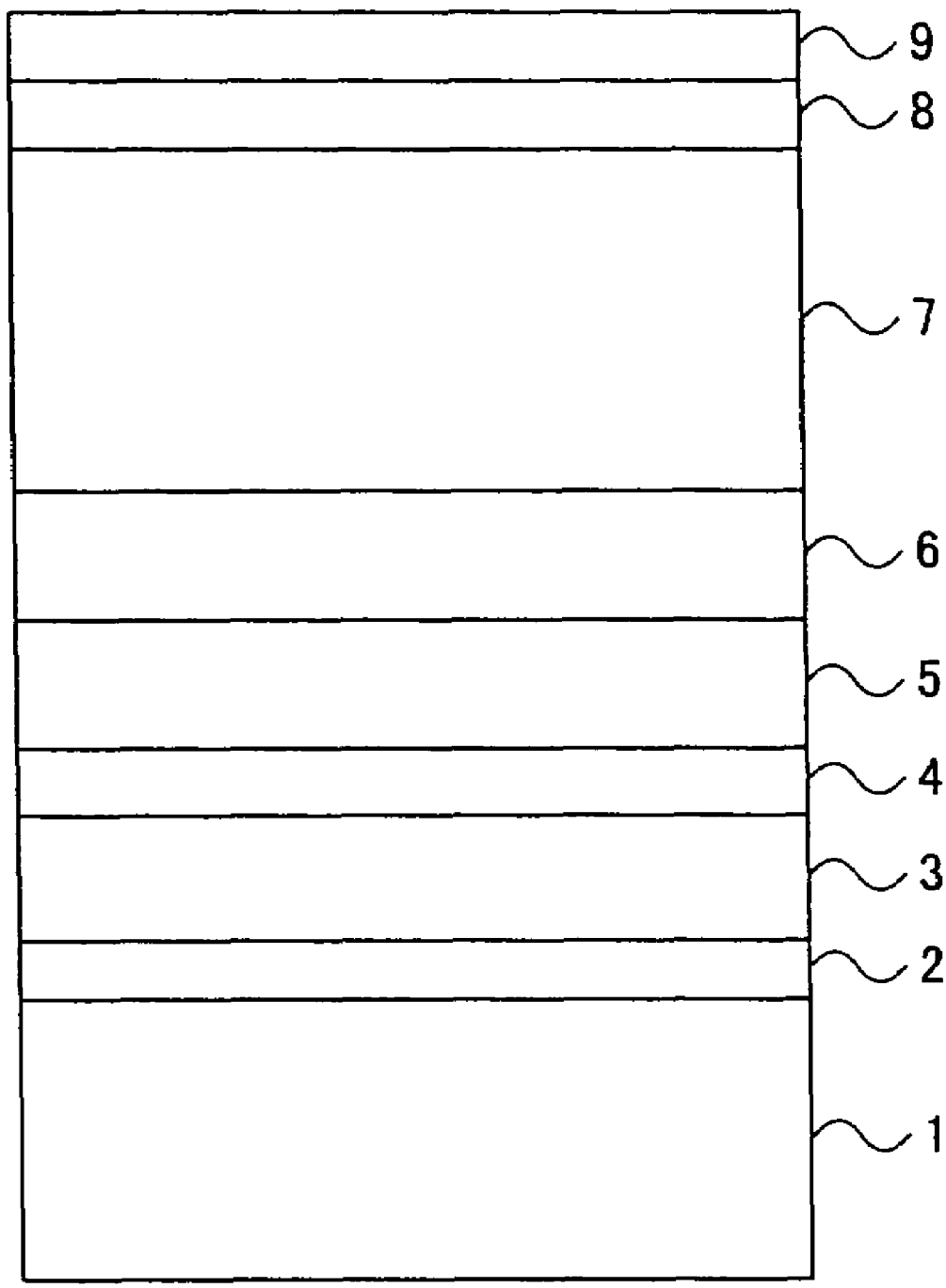
FIG. 1 is a cross sectional view showing a part of a first example of a conventional magnetic recording medium.
Figure 2:
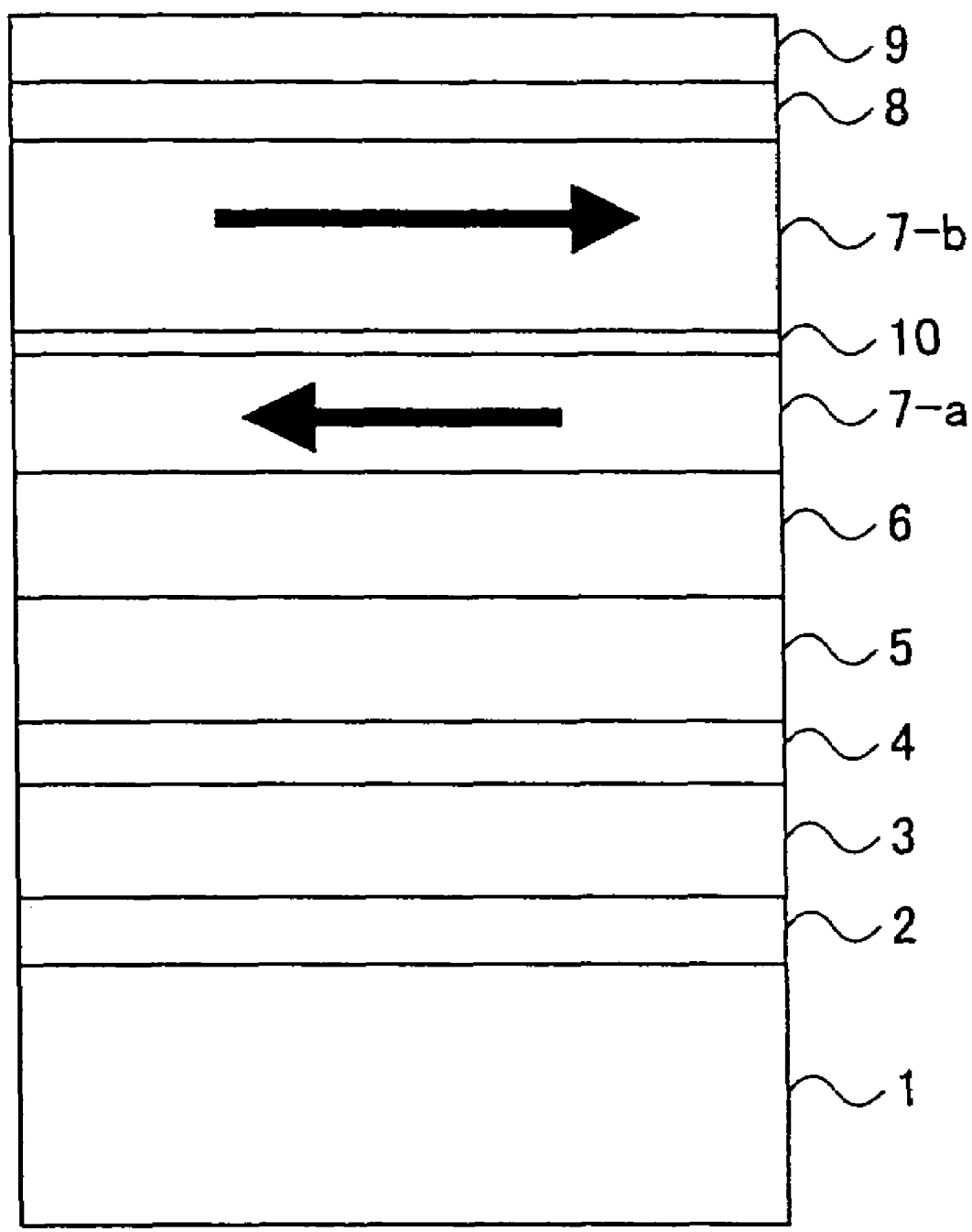
FIG. 2 is a cross sectional view showing a part of a second example of the conventional magnetic recording medium.
Figure 3:
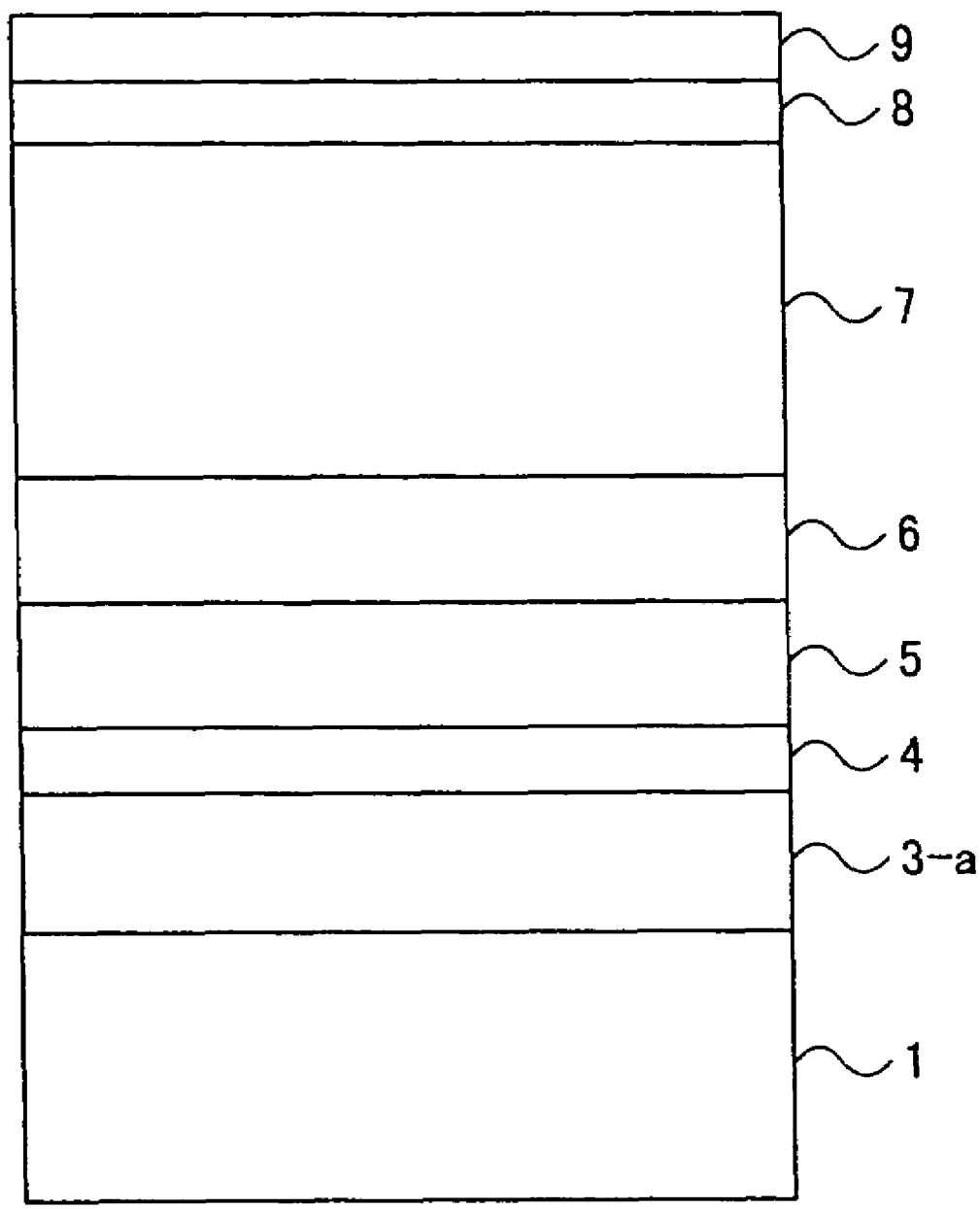
FIG. 3 is a cross sectional view showing a part of a third example of the conventional magnetic recording medium.
Figure 4:
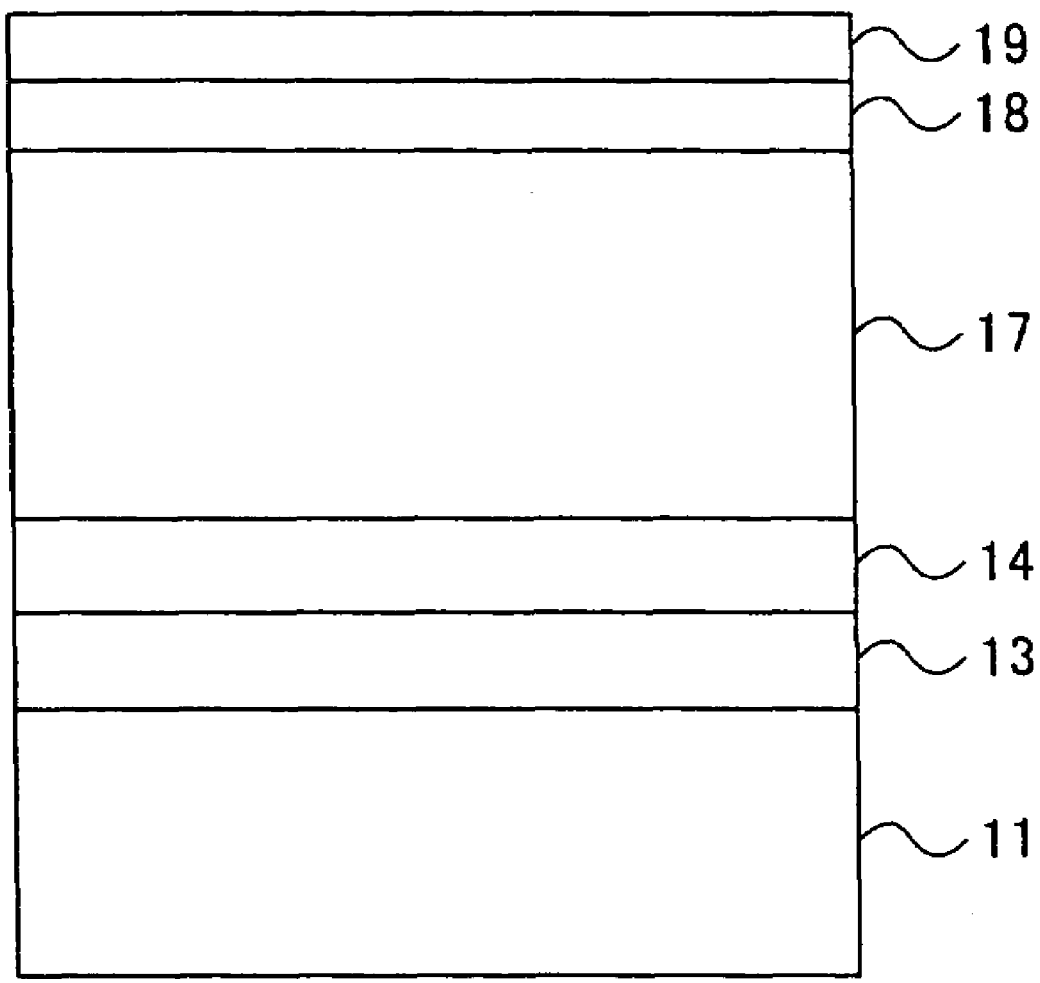
FIG. 4 is a cross sectional view showing an important part of a first embodiment of a magnetic recording medium according to the present invention.

FIG. 4 is a cross sectional view showing an important part of a first embodiment of a magnetic recording medium according to the present invention. In FIG. 4, on a glass or Al substrate 11 is deposited a seed layer 13 and an underlayer 14 made of an intermetallic binary alloy. The seed layer 13 is made essentially of one of the elements of binary alloy underlayer 14. The seed layer 13 may be reactively sputtered with $N_2$ or $O_2$ partial pressures, for example. On the underlayer 14 is deposited a magnetic layer 17 made of a Co alloy or a CoCr alloy. The magnetic layer 17 has a (11$\bar{2}$0) crystallographic orientation, and may be made up of a single layer or multiple layers that are in direct contact and behave magnetically as one magnetic layer. On the magnetic layer 17, a protective layer 18 made of C, and an organic lubricant layer 19 are deposited for use with a magnetic transducer such as a spin-valve head.

The glass or Al substrate 11 may be mechanically textured.

The underlayer 14 is made of a binary alloy such as AlRu, preferably B2 structured. The binary alloy used promote lattice matching and crystallographic orientation of subsequent layers. For example, RuAl, CoTi or the like are useful for obtaining a good lattice matching with the (002) growth of Cr and subsequent (11$\bar{2}$0) texture of magnetic layers. The underlayer may be made of B2 structured materials such as RuAl, NiAl, CoAl, FeAl, FeTi, CoHf, CoZr, NiTi, CuBe, CuZn, AlMn, AlRe, AgMg, MnRh, IrAl and OsAl which have approximately 40% to 60% composition ranges of one of the elements. Usually, approximately 50% is the composition range where the B2 structure formation occurs for the above mentioned binary alloys. But in some cases like VAl, a high percentage of Al, of the order of approximately 75%, for example, is needed to obtain the structure similar to B2 structure.

The underlayer material forming B2 structure may be deposited by sputtering from two separate metal targets or from separate metal targets whose compositions are predominantly formed from one type of material of the binary alloy. The underlayer 14 is deposited to a thickness of approximately 5 nm to 60 nm, for example.

The seed layer 13, which functions as a buffer layer, is deposited prior to the underlayer 14, and is made of one of the elements which makes the binary alloy forming the underlayer 14. For example, an Al or Ru seed layer 13 is used for an AlRu underlayer, and a Fe or Ti seed layer 13 is used for a FeTi underlayer 14. In addition, the seed layer 13 may essentially be made of a metal nitride or oxide of one of the elements which makes the binary alloy forming the underlayer 14. In other words, an Al—N or Al—O seed layer 13 may be used for an AlRu underlayer 14, and a Ti—O or Ti—N seed layer 13 may be used for a FeTi underlayer 14. The metal nitride or oxide seed layer 13 promotes an excellent crystallographic orientation for the underlayer 14 and provides excellent (002) growth for Cr based subsequent layers and very good (11$\bar{2}$0) texture for the magnetic layer 17.

The seed layer 13 is deposited to a thickness of approximately 0.5 nm to 50 nm, for example. Desirably, a total thickness of the seed layer 13 and the underlayer 14 is approximately 30 nm to 60 nm. This desired range of the total thickness can be deposited in just two chambers and reduces the drop in glass substrate temperature during deposition of subsequent layers. The seed layer 13 may be processed under a suitable temperature range of approximately 100° C. to 230° C. with a pressure of approximately 5 mTorr to 50 mTorr with or without the substrate bias. The substrate bias may be applied to a metallic substrate made of a material such as Al, however, a pre-seed layer made of a material such as Cr is desired for biasing when using a glass substrate.

The protective layer 18 is made of C having a thickness of approximately 1 nm to 5 nm, for example. In addition, the organic lubricant layer 19 has a thickness of approximately 1 nm to 3 nm. The C protective layer 18 may be deposited by CVD is hard, and protects the magnetic recording medium not only from atmospheric degradation but also from physical contacts with the head. The lubricant layer 19 reduces stiction between the head and the magnetic recording medium.

Figure 5:
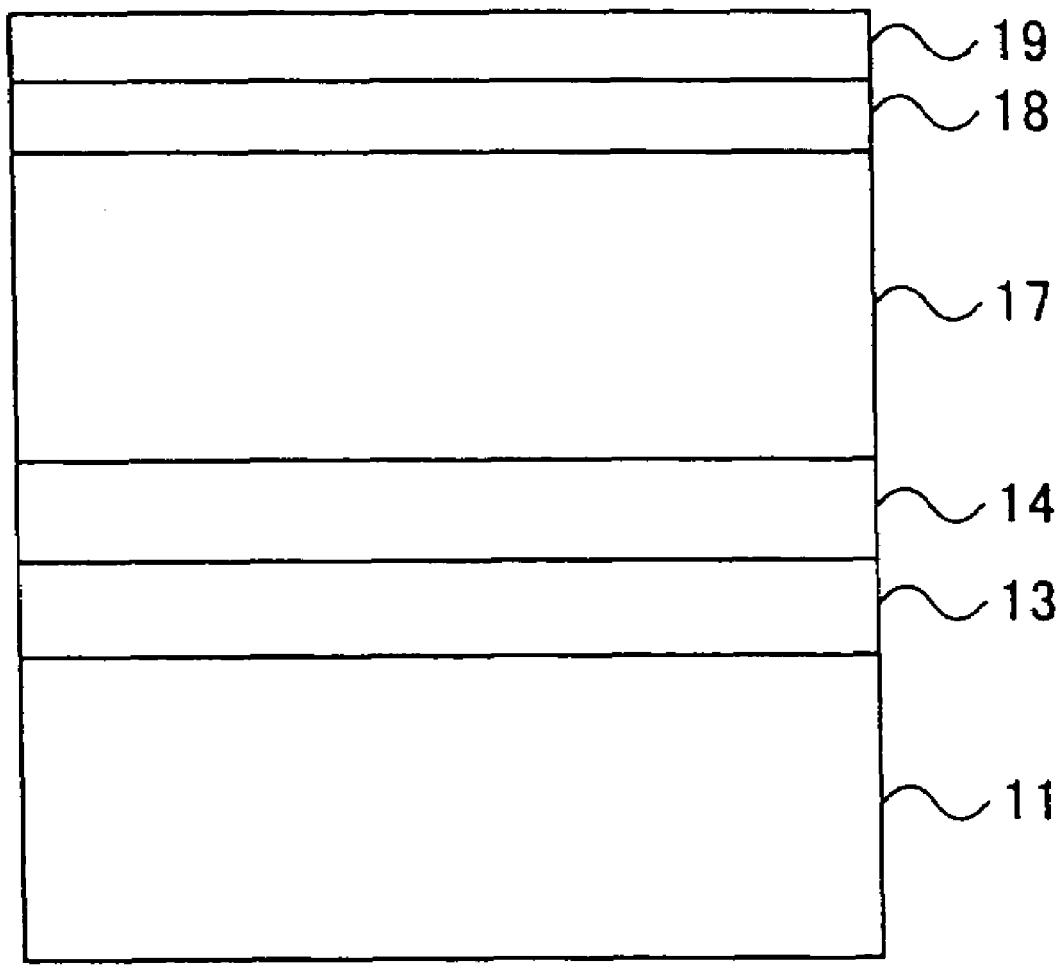
FIG. 5 is a cross sectional view showing an important part of a second embodiment of the magnetic recording medium according to the present invention.

FIG. 5 is a cross sectional view showing an important part of a second embodiment of the magnetic recording medium according to the present invention. In FIG. 5, those parts which are the same as those corresponding parts in FIG. 4 are designated by the same reference numerals, and a description thereof will be omitted.

In FIG. 5, a seed layer 13 reactively sputtered with N or O is employed. This seed layer 13 improves the IPO significantly from the first embodiment described above.

Figure 6:
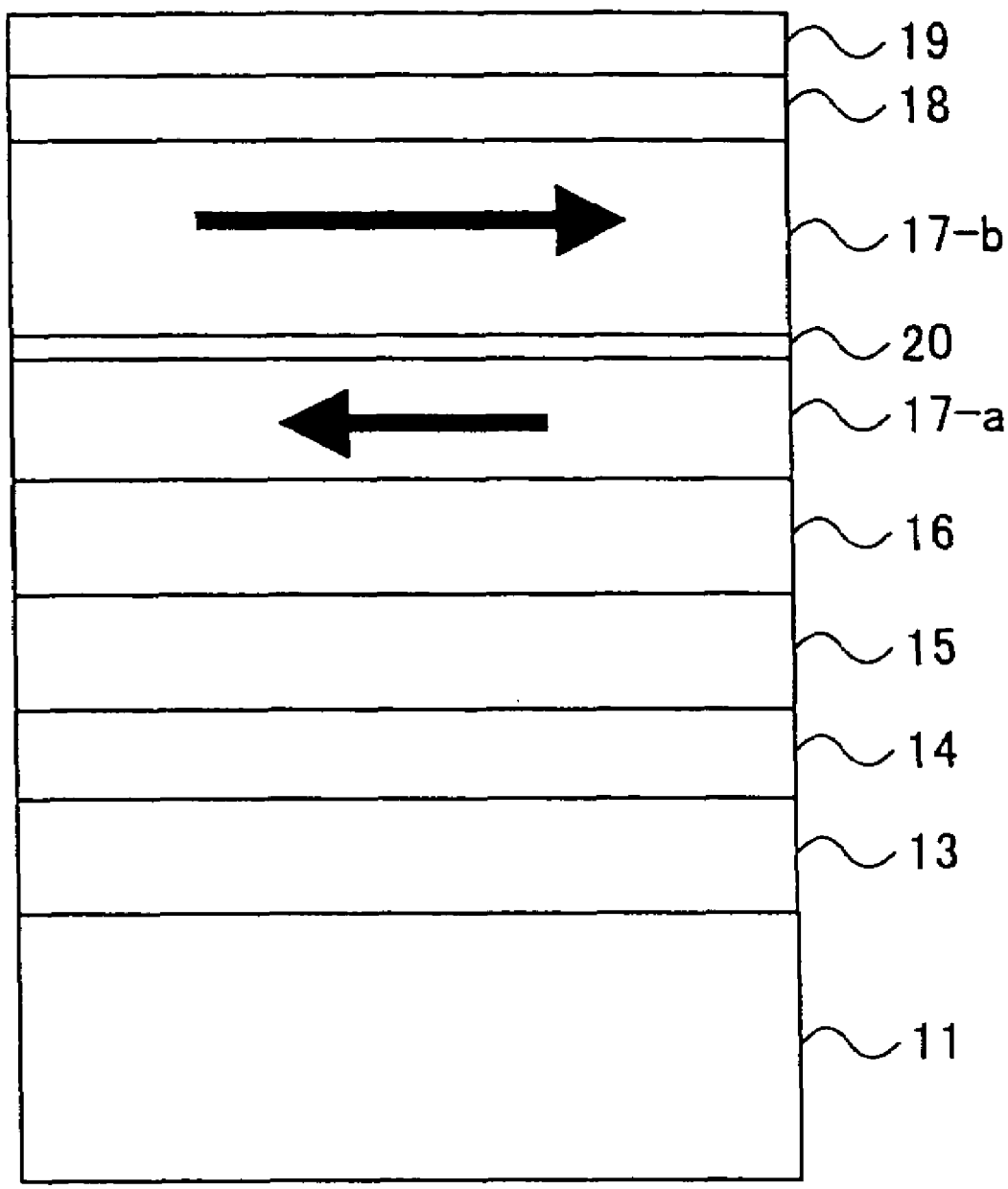
FIG. 6 is a cross sectional view showing an important part of a third embodiment of the magnetic recording medium according to the present invention.

FIG. 6 is a cross sectional view showing an important part of a third embodiment of the magnetic recording medium according to the present invention. In FIG. 6, those parts which are the same as those corresponding parts in FIG. 4 are designated by the same reference numerals, and a description thereof will be omitted.

In FIG. 6, a plurality of magnetic layers 17-a and 17-b that are antiferromagnetically coupled through a Ru spacer layer 20 to form the so-called synthetic ferrimagnetic medium (SFM) structure. Furthermore, a lattice matching layer 15 may be disposed between the magnetic layer structure (17-a, 17-b) and the underlayer 14 for lattice matching with the magnetic layer structure (17-a, 17-b) and prevention of diffusion from the underlayer 14 into the magnetic layer structure (17-a, 17-b). An hcp interlayer 16 may be inserted between the magnetic layer structure (17-a, 17-b) and the underlayer 14. The hcp interlayer 16 also serves as a buffer between the bcc underlayer 14 and the hcp magnetic layer structure (17-a, 17-b).

The lattice matching layer 15 may be made of Cr—M layer and deposited to a thickness of approximately 1 nm to 10 nm, where M is a material selected from a group consisting of Mo, Ti, V, and W with an atomic proportion greater than or equal to 10%. Alternatively, the lattice matching layer 14 may be made essentially of Ru having a thickness of approximately 1 nm to 3 nm. However, since the lattice parameters of the Ru lattice matching layer 15 are larger than those of the Co alloy or CoCr alloy used for the magnetic layers 17-a and 17-b, the Ru lattice matching layer 15 cannot be too thick.

The hcp interlayer 16 is made of a slightly magnetic or nonmagnetic hcp structured CoCr alloy which is deposited to a thickness of approximately 1 nm to 5 nm. The hcp structured CoCr alloy includes CoCrPtB, CoCrPt, CoCrTa, CoCrPtTa, CoCrPtTaB and the like. When hcp magnetic CoCr alloys are grown directly on bcc Cr alloy films, a portion of the magnetic layer 17-a in contact with the bcc underlayer 14 is adversely affected due to lattice mismatch and/or diffusion of elements from seed layer 13, and in this case, the magnetic anisotropy of the magnetic layer 17-a is reduced as well as the total magnetization of the magnetic layer structure (17-a, 17-b). The use of the hcp nonmagnetic interlayer 16 prevents such undesirable effects from occurring on the magnetic layer structure (17-a, 17-b). As a result, the magnetic anisotropy and the coercivity of the magnetic layer structure is increased. In addition, the in-plane orientation of the magnetic layer structure is improved as the interlayer 16 functions to gradually match the lattice parameters, and the full magnetization of the magnetic layer structure is obtained, that is, the so-called "dead layer" is minimized. Moreover, the formation of smaller grains at the interface of the magnetic layer structure is also minimized.

The SFM structure may be made up of at least two antiferromagnetically coupled CoCr alloy magnetic layers, wherein c-axes of the magnetic layers are significantly parallel to the film plane thereof such that a ratio h ≦0.15, where h=Hc⊥ /Hc, Hc⊥ denotes perpendicular coercivity, and Hc denotes coercivity along the film plane. The SFM has an improved thermal stability but require excellent in-plane orientation which is provided by the above described combination of the seed layer 13 and the underlayer 14.

Therefore, the embodiments described above provide a scheme for making a (001) texture from a B2 structured alloy or a binary alloy. In order to obtain the (001) texture from a B2 structured material, essentially the first deposited seed layer 13 on the substrate 11 needs to be made of one of elements forming binary alloy of the underlayer 14. This fact is made use to define a very thin and preferably a monolayer metal film as the seed layer 13.

The deposition condition for the underlayer material such as AlRu is crucial for developing the desired texture, especially when deposited using the multicathode system where pure metallic targets are co-sputtered with different power ratios to obtain the desired texture. Most important deposition conditions which describe the proper texture are substrate temperature, thicknesses of films, sputtering pressure and substrate bias. A description will now be given of the AlRu growth properties for different deposition (sputtering) conditions.

Figure 7:
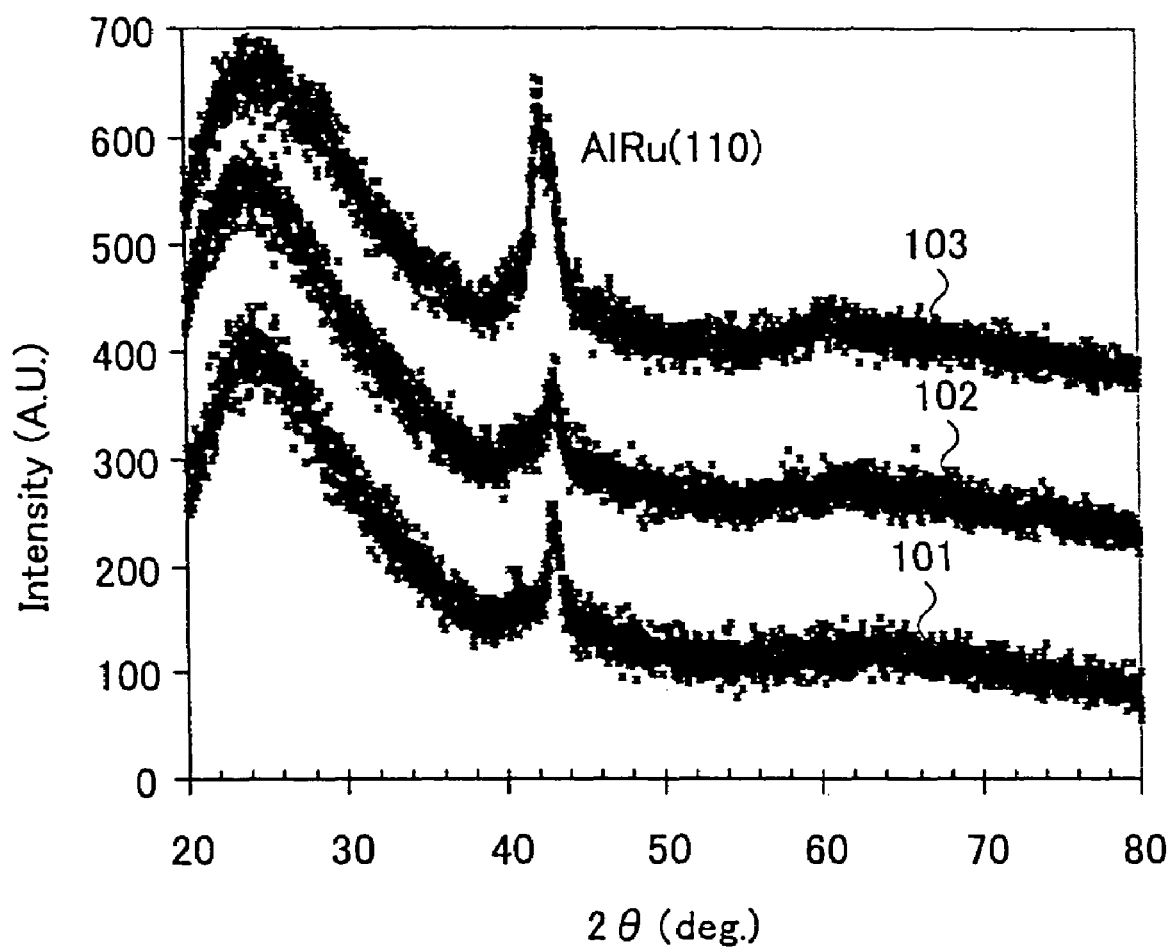
FIG. 7 is a diagram showing XRD spectrums of AlRu samples co-sputtered from Al and Ru targets for different AlRu thicknesses.
Figure 8:
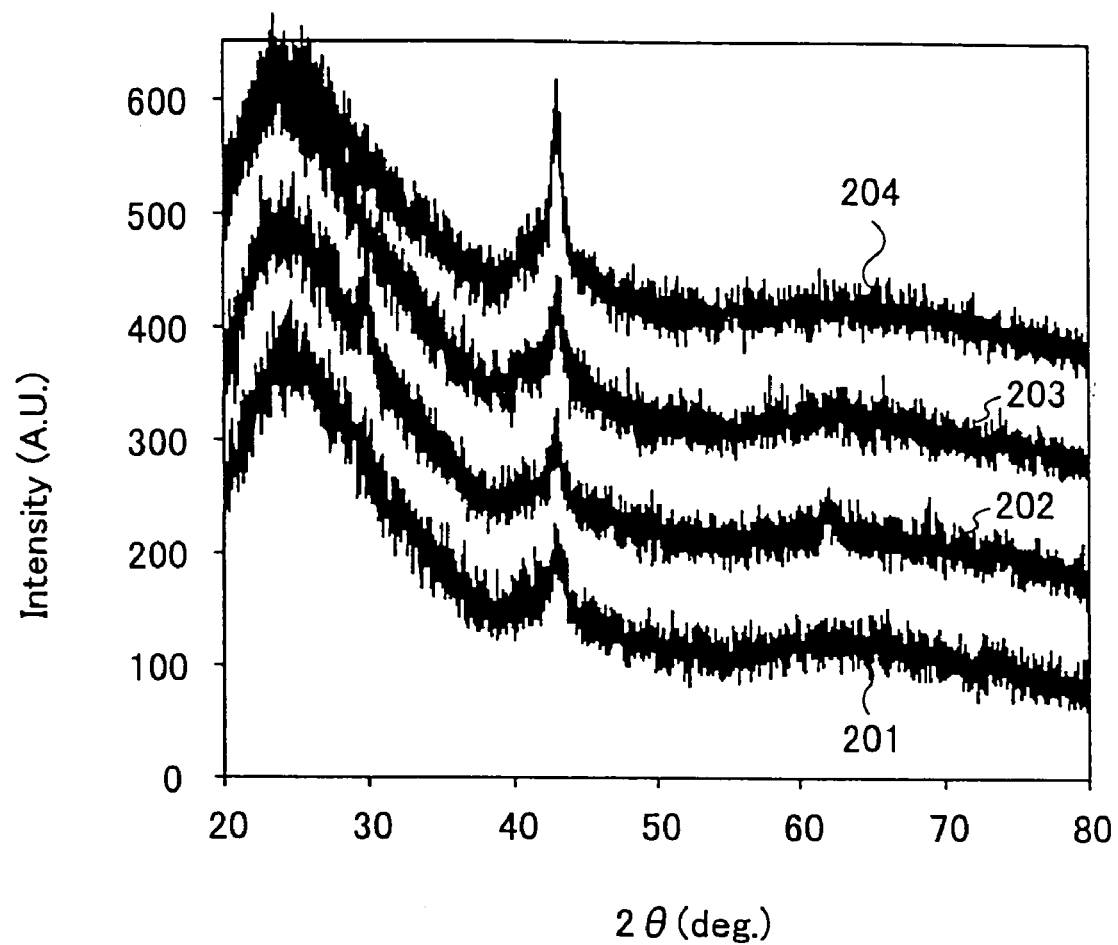
FIG. 8 is a diagram showing XRD spectrums of AlRu samples co-sputtered from Al and Ru targets for different substrate temperatures.
Figure 9:
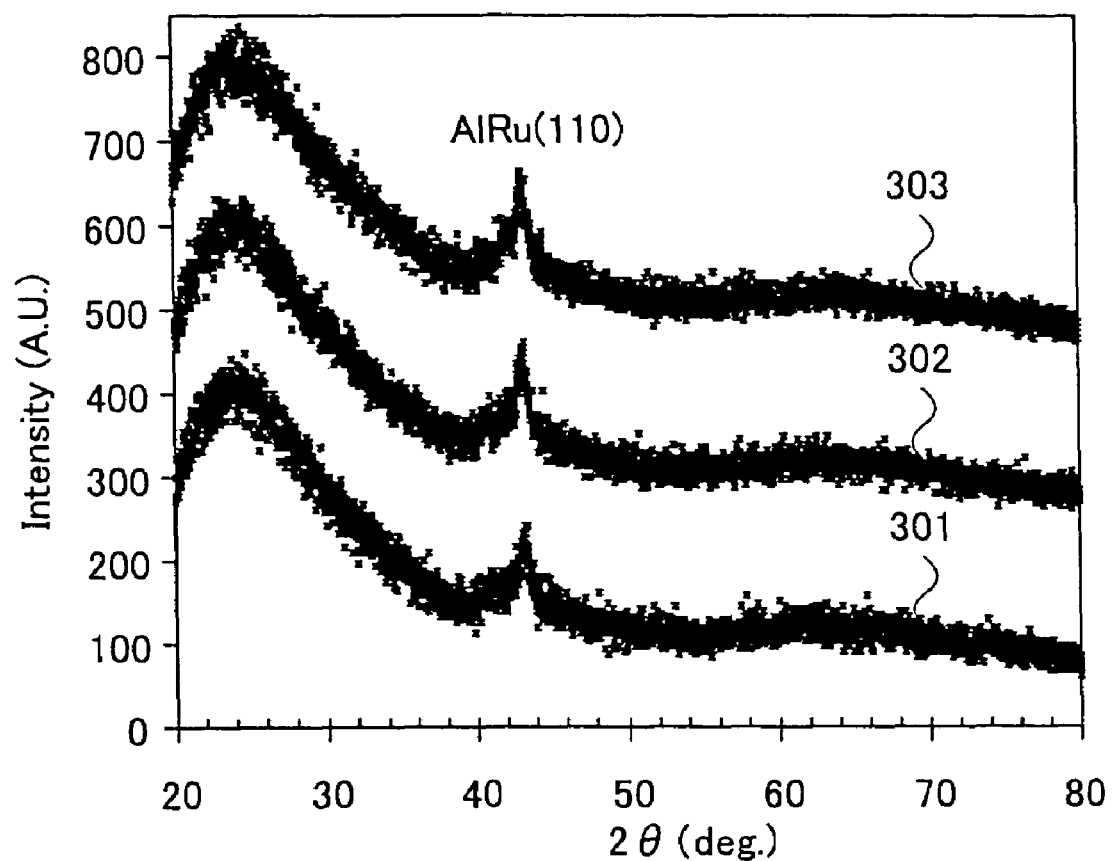
FIG. 9 is a diagram showing XRD spectrums of AlRu samples co-sputtered from Al and Ru targets for different sputtering Ar pressures.

FIGS. 7 through 9 show XRD spectrums of AlRu/CrMo/ CoCrPtB structures deposited at different sputtering conditions for the AlRu underlayer 14. Each AlRu/

CoCrPtB structure is made up of the AlRu underlayer 14, the CrMo lattice matching layer 15, and the CoCrPtB interlayer 16. The AlRu underlayer 14 is formed by co-sputtering from two different pure metal targets of Al and Ru. An $Al_{50}Ru_{50}$ composition can be easily obtained by changing the power ratios applied between the two targets. In FIGS. 7 through 9, the ordinate indicates the intensity in arbitrary units (A.U.), and the abscissa indicates 2θ (degrees).

FIG. 7 is a diagram showing XRD spectrums of AlRu samples co-sputtered from Al and Ru targets for different AlRu thicknesses. In other words, FIG. 7 shows the XRD spectrum of the AlRu samples with different AlRu layer thicknesses ranging from 3 nm to 100 nm. Curves 101, 102 and 103 respectively correspond to AlRu layer thicknesses of 3 nm, 20 nm and 100 nm. It is clear from the XRD spectrums that a prominent peak appears near 2θ of approximately 43°. This peak corresponds to AlRu (110) which is not a desired texture for the subsequent Cr and magnetic recording layer 17. The texture which is of interest is the AlRu(002) which has the XRD peak around 2θ of approximately 30° which will give Cr(002) and Co(11$\bar{2}$0) textures. In this case, for all the thickness ranges AlRu(110) texture is dominant. In this case, the substrate temperature was kept at 150° C. and 5 mTorr Ar pressure was used for the sputtering.

FIG. 8 is a diagram showing XRD spectrums of AlRu samples co-sputtered from Al and Ru targets for different substrate temperatures. In other words, FIG. 8 shows the effect of the substrate temperature on the growth of AlRu layer. Curves 201, 202, 203 and 204 respectively correspond to substrate temperatures of 230° C., 200° C., 150° C. and 0° C. In this case, Ar pressure used for the sputtering was kept at 5 mTorr and the AlRu layer thickness was kept constant at 20 nm. The substrate temperature was changed from 0° C. to 230° C. It is clear from the FIG. 8 again that AlRu(110) texture is dominant and AlRu(002) texture is clearly absent.

Another important sputtering parameter is the Ar pressure used for the sputtering. This variation and the corresponding texture growth is shown in FIG. 9. FIG. 9 is a diagram showing XRD spectrums of AlRu samples co-sputtered from Al and Ru targets for different sputtering Ar pressures. Curves 301, 302 and 303 respectively correspond to Ar pressures of 5 mTorr, 20 mTorr and 50 mTorr. In this case also, the required AlRu(002) texture is clearly absent.

Figure 10:
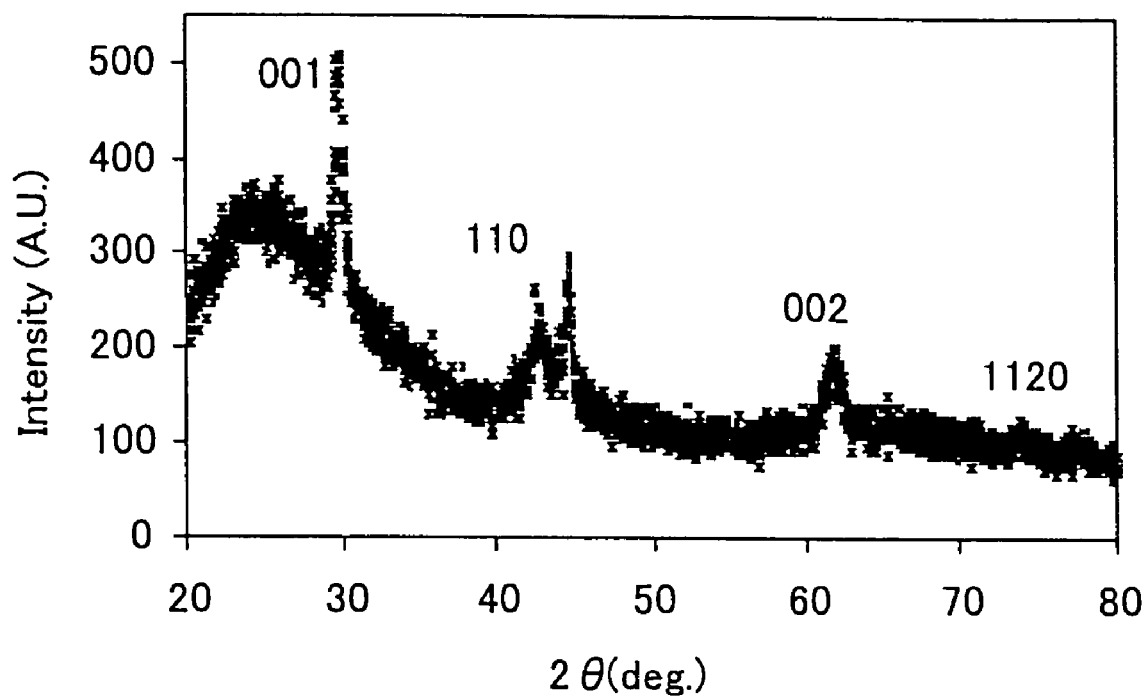
FIG. 10 is a diagram showing an XRD spectrum of AlRu samples co-sputtered from Al and Ru targets by applying a substrate bias of −150V.
Figure 11:
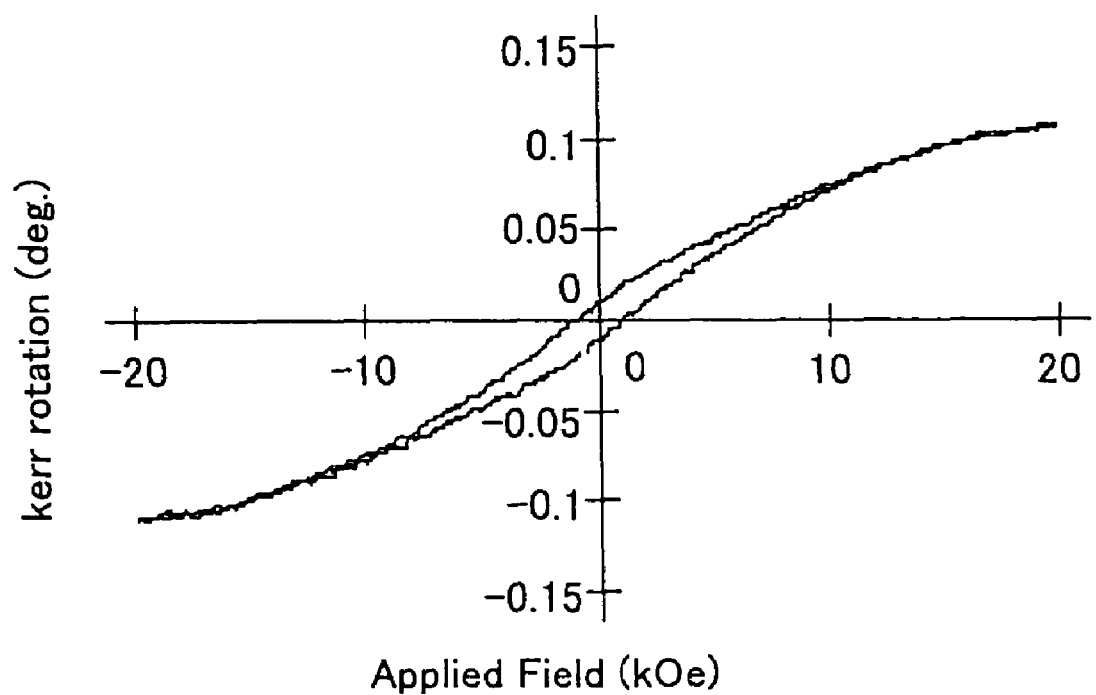
FIG. 11 is a diagram showing a perpendicular Kerr loop obtained for a AlRu/CrMo/CoCrPtB structure.

Next, a description will be given of the substrate bias effect to AlRu growth, by referring to FIGS. 10 and 11. FIG. 10 is a diagram showing an XRD spectrum of AlRu samples co-sputtered from Al and Ru targets by applying a substrate bias of –150V. In FIG. 10, the ordinate indicates the intensity in arbitrary units (A.U.), and the abscissa indicates 2θ (degrees). FIG. 11 is a diagram showing a perpendicular Kerr loop obtained for a AlRu/CrMo/CoCrPtB structure, where the AlRu under layer 14 is 100 nm, the CrMo lattice matching layer 15 is 5 nm and the CoCrPtB interlayer 16 is 18 nm. In FIG. 11, the ordinate indicates the Kerr rotation (degrees), and the abscissa indicates the applied field (kOe).

For the substrate biasing, it is necessary to deposit a thin layer of Cr/NiP before an AlRu layer. In this case, the growth properties are slightly different for the two layers, but it gives the clue as to what causes the absence of growth of AlRu(002). The substrate temperature was 150° C. and a substrate bias of –150 V was applied. In this case, a predominant AlRu(001) growth was observed, along with a relatively much lower AlRu(110) texture. Thus, out of all the sputtering conditions, only the substrate biased samples with low sputtering power yield the RuAl(001) phase with relatively larger RuAl underlayer thickness greater than 50 nm. Substrate bias with higher sputtering power gives mostly RuAl(110) phase as in the case of other deposition conditions. The possible mechanism is just opposite to that of any bcc materials like Cr, where a (002) surface is parallel to the surface of the substrate 11. In the case of the RuAl underlayer 14, a (110) surface predominantly grows parallel to the surface of the substrate 11 and hence formation of this RuAl(110) phase is easy. But when the biasing field is applied, kinetic energy of bombarding particles (Ar+ions) are also increased. Hence, it helps to predominantly form one type of element, in this case, either Al or Ru. The scattering probability is higher for Al than Ru. Since the atomic radius of Ru is smaller than that of Al, with biasing, it is possible that mostly Ru is adhered to the substrate 11 initially. This is schematically represented in FIGS. 12 and 13.

Figure 12:
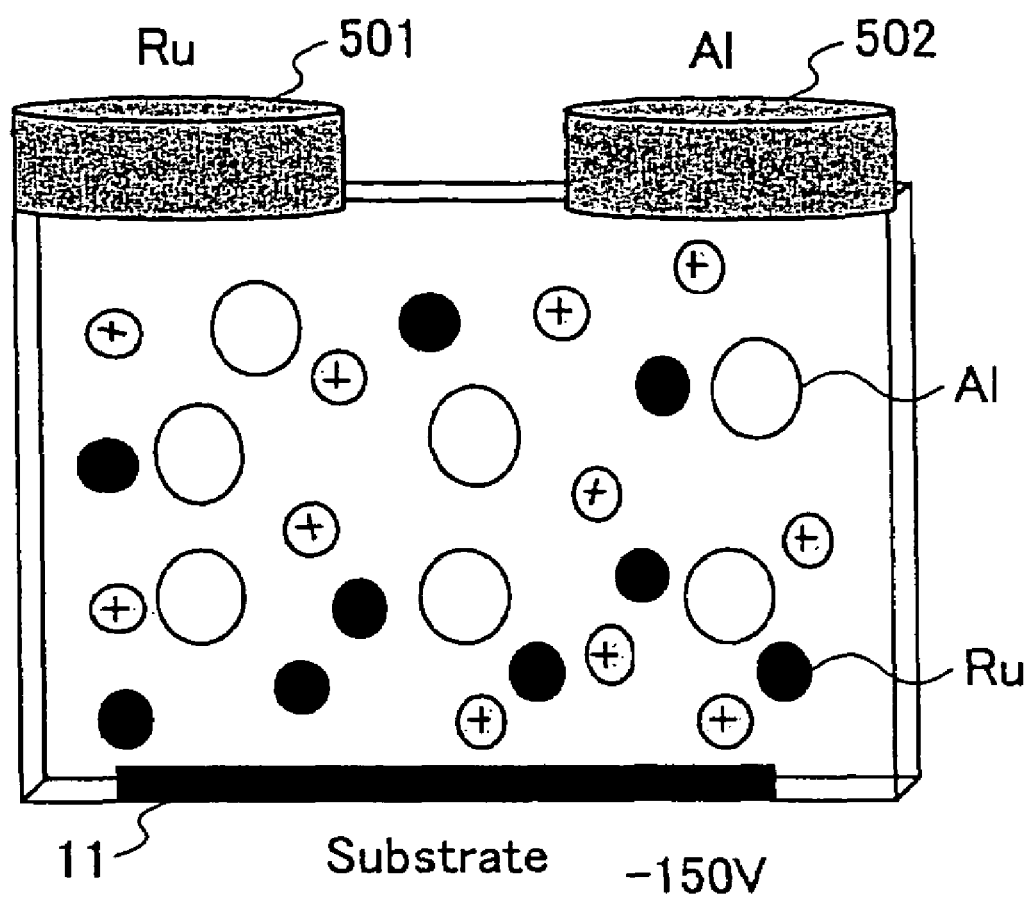
FIG. 12 is a diagram showing a schematic representation of a substrate biasing effect and AlRu initial film growth.
Figure 13:
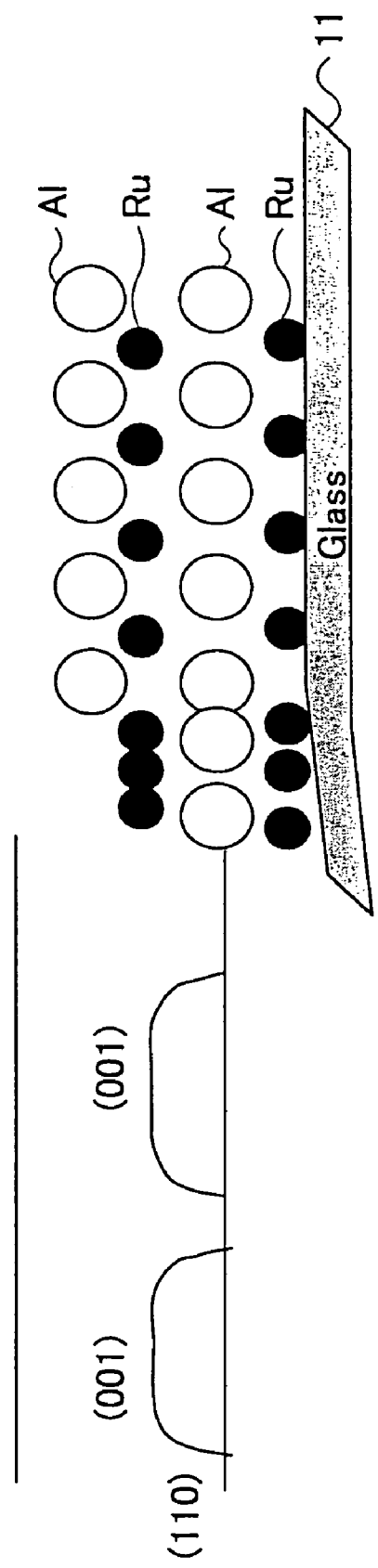
FIG. 13 is a diagram for explaining the substrate biasing effect and the AlRu initial film growth.

FIG. 12 is a diagram showing a schematic representation of a substrate biasing effect and AlRu initial film growth. In FIG. 12, reference numerals 501 and 502 respectively denote an Ru target and an Al target. In addition, FIG. 13 is a diagram for explaining the substrate biasing effect and the AlRu initial film growth. In FIG. 13, the left part indicates the (001) and (110) growths on the substrate 11, and the right part indicates the Al and Ru sputtered on the substrate 11 with substrate biasing.

It may be understood from the description given heretofore that it is important to add a thin layer of metal (seed layer 13) prior to depositing a layer of the binary alloy (underlayer 14). This enables the growth of (001) texture whose surface is made predominantly of one type of elements as is clear from FIG. 14.

Figure 14:
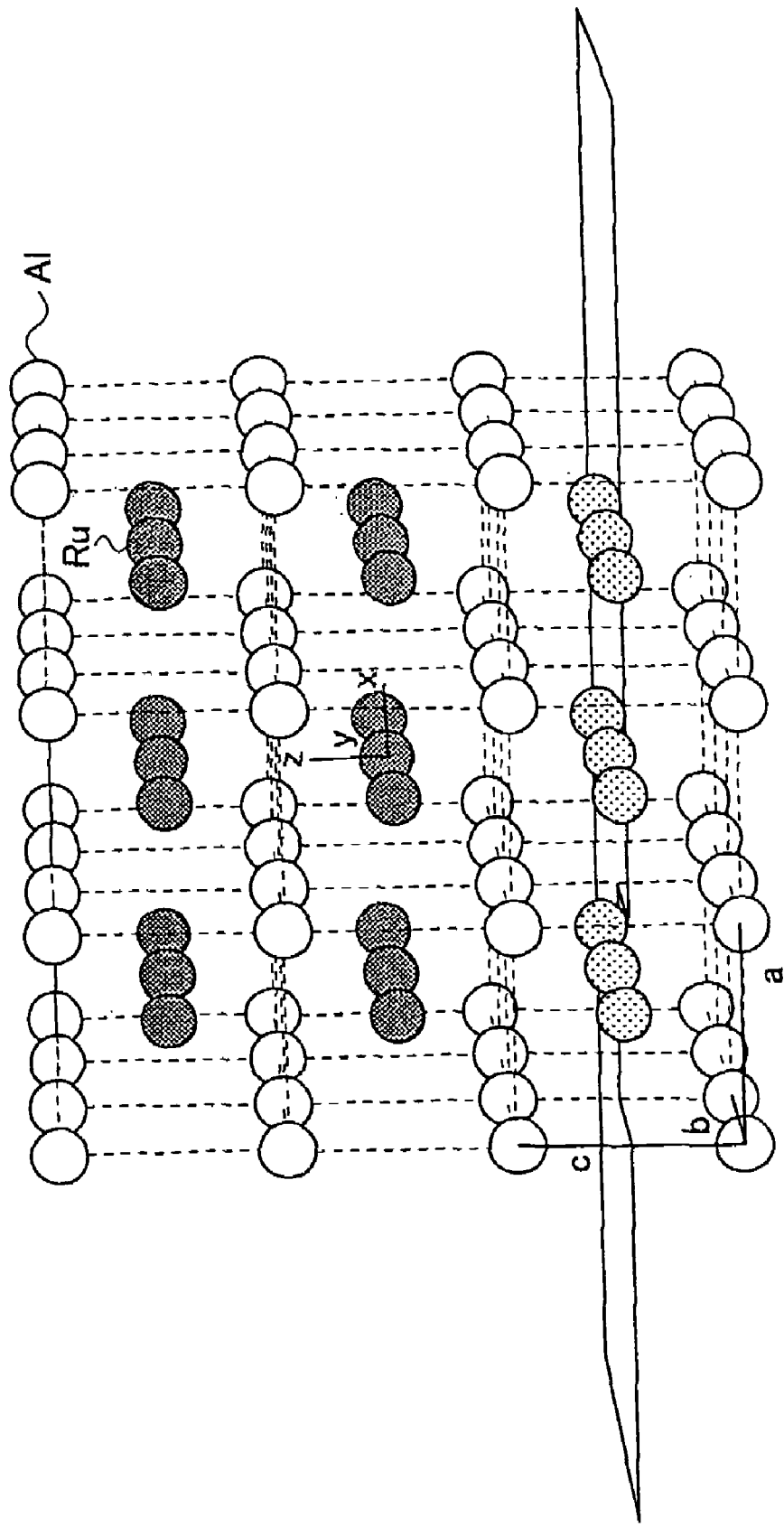
FIG. 14 is a diagram showing a (001) texture of AlRu, where only one type of element is present in the same plane.

FIG. 14 is a diagram showing a (001) texture of AlRu, where only one type of element is present in the same plane. In other words, FIG. 14 shows the texture of AlRu cell structure. It should be noted that, in the case of the (001) texture, one surface contains always the same element, namely, Ru or Al. Such growth can be imparted by pre-depositing a pure Al or Ru seed layer 13 prior to the AlRu underlayer 14. This could be applicable to any binary alloy preferably B2 structured ones where the seed layer consists of a thin predominantly containing one of the pure element, prior to the deposition of the binary alloy. This method is tried as an example in the formation of AlRu layer.

Figure 15:
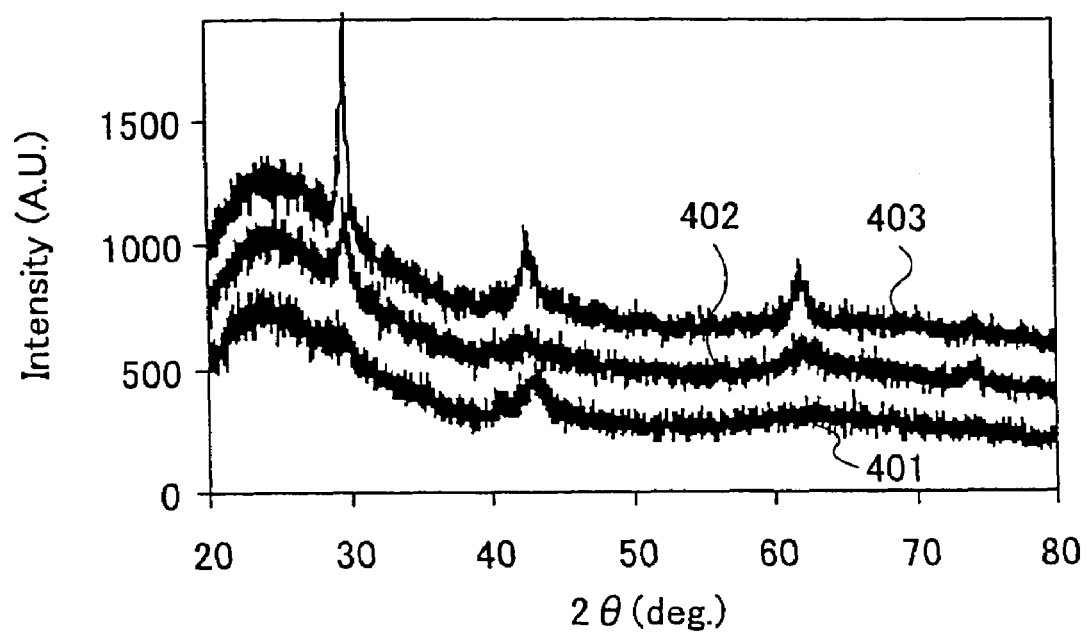
FIG. 15 is a diagram showing XRD spectrums of Glass/Al/AlRu/CrMo/CoCrPtB/ structures, where a predominant (001) texture of AlRu exists.

FIG. 15 is a diagram showing XRD spectrums of Glass/ Al/AlRu/CrMo/CoCrPtB structures, where a predominant (001) texture of AlRu exists. In other words, FIG. 15 shows the XRD pattern taken from Glass/Al/AlRu/CrMo/CoCrPtB structures for various thicknesses of Al. Each Glass/Al/ AlRu/CrMo/CoCrPtB structure is made up of the glass substrate 11, the Al seed layer 13, the AlRu underlayer 14, the CrMo lattice matching layer 15, and the CoCrPtB interlayer 16. Curves 401, 402 and 403 respectively correspond to a case where the Al seed layer 13 is 3 nm and the AlRu underlayer 14 is 30 nm, a case where the Al seed layer 13 is 1 nm and the AlRu underlayer 14 is 30 nm, and a case where the Al seed layer 13 is 3 nm and the AlRu underlayer 14 is 100 nm. It is clear that by introducing a very thin Al seed layer 13, the AlRu(001) texture is easily formed.

Figure 16:
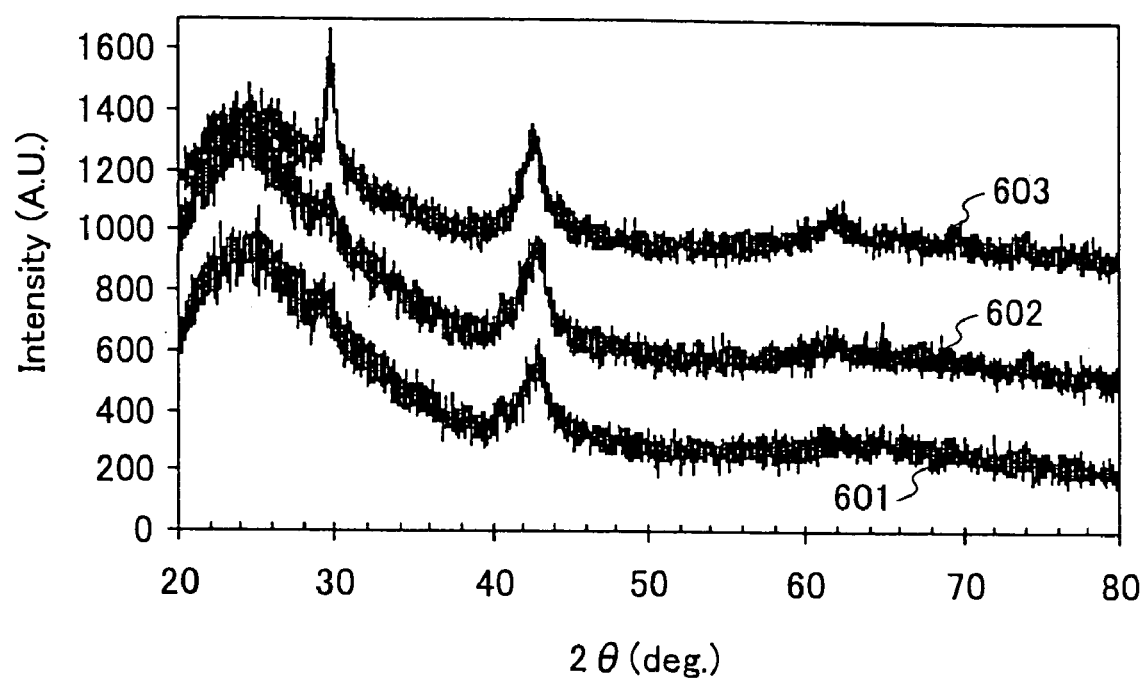
FIG. 16 is a diagram showing XRD spectrums of Glass/Ru/AlRu/CrMo/CoCrPtB/ structures, where AlRu has a predominant (001) texture.

Similarly, the AlRu(001) texture is easily formed by introducing a very thin Ru seed layer 13 prior to co-sputtering of AlRu, as may be seen from FIG. 16. FIG. 16 is a diagram showing XRD spectrums of Glass/Ru/AlRu/ CrMo/CoCrPtB/ structures, where AlRu has a predominant (001) texture. In other words, FIG. 16 shows the XRD pattern taken from Glass/Ru/AlRu/CrMo/CoCrPtB structures for various thicknesses of Ru. Each Glass/Ru/AlRu/ CrMo/CoCrPtB structure is made up of the glass substrate 11, the Ru seed layer 13, the AlRu underlayer 14, the CrMo lattice matching layer 15, and the CoCrPtB interlayer 16. Curves 601, 602 and 603 respectively correspond to a case where the Ru seed layer 13 is 1 nm and the AlRu underlayer 14 is 30 nm, a case where the Ru seed layer 13 is 3 nm and the AlRu underlayer 14 is 30 nm, and a case where the Ru seed layer 13 is 3 nm and the AlRu underlayer 14 is 100 nm.

Comparing both the cases shown in FIGS. 15 and 16, it may be seen that the Al seed layer 13 gives a better AlRu(001) texture in comparison to the Ru seed layer 13. But in both cases, as expected, a strong AlRu(001) texture appears for the AlRu underlayer 14 deposited on top thereof.

Figure 17:
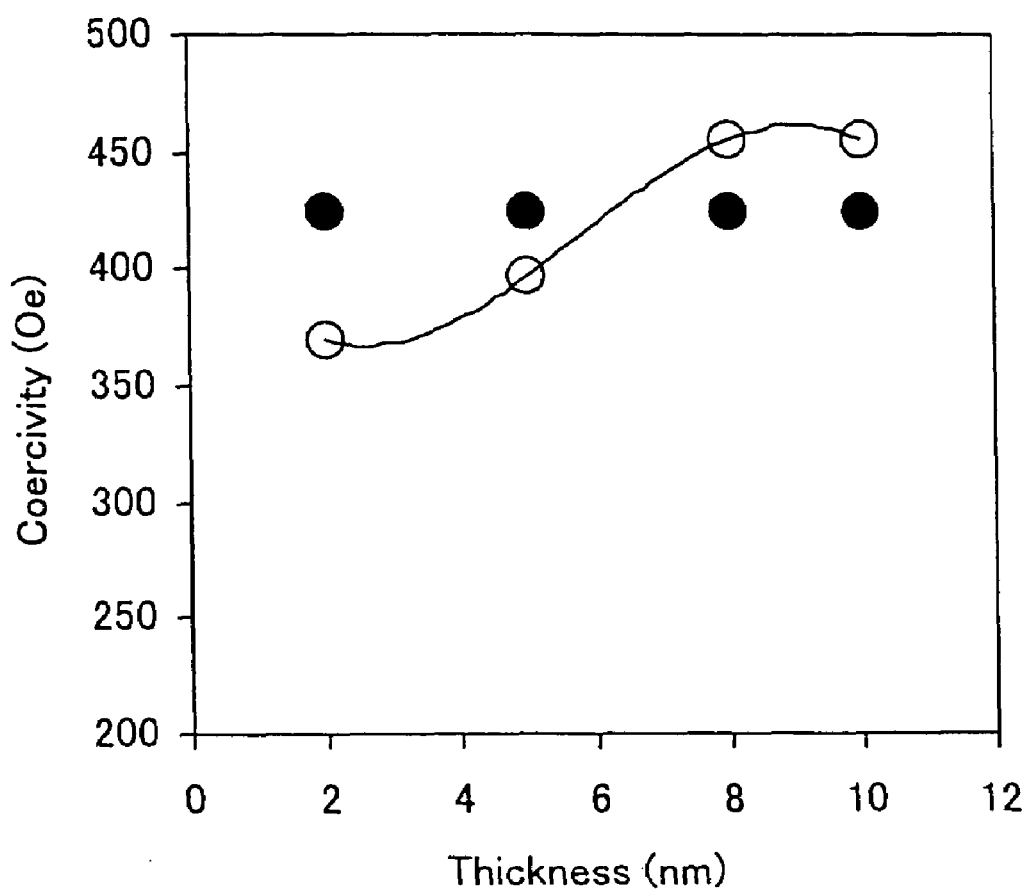
FIG. 17 is a diagram showing perpendicular coercivity values of Al(or Ru)/AlRu/CrMo/CoCrPtB/structures.

FIG. 17 is a diagram showing perpendicular coercivity values of Al (or Ru)/AlRu/CrMo/CoCrPtB structures. In other words, FIG. 17 shows the perpendicular coercivity values of Al (or Ru)/AlRu/CrMo/CoCrPtB structure measured using Kerr measurements. In FIG. 17, the ordinate indicates the perpendicular coercivity (Oe), and the abscissa indicates the thickness (nm) of the Al (or Ru) seed layer 13. Further, a symbol ○ indicates the coercivity for the Al/AlRu seed layer and underlayer combination, and a symbol ● indicates the coercivity for the Ru/RuAl seed layer and underlayer combination. Small thicknesses of the seed layer 13 tend to give lower perpendicular coercivity values which are useful. Normally a suitable substrate temperature range of approximately 100° C. to 230° C. gives good crystallographic texture and good adhesion of the layers. However, for different binary alloy systems and for different texture requirements, the substrate temperature may be appropriately adjusted to obtain the same effects. Normally, a wide sputtering gas pressure range of 5 mTorr to 50 mTorr may be used with or without the substrate bias. These are the usual sputtering conditions employed to produce the magnetic recording medium. Substrate bias can be applied to a metallic substrate made of Al or the like, however, a metallic pre-seed layer made of a material such as Cr is essential for biasing if using the glass substrate.

Though the particular growth described above is applied to the magnetic recording medium, there are other areas of applications such as to semiconductor devices and laser devices, where a (001) growth from a binary alloy is desired. For example, GaAs(100) texture is very much used in the present day material for obtaining particular orientation (or texture) in semiconductor devices. Normally, a single crystal substrate is preferred in such cases. However, with sputtering, such a texture can be easily grown by depositing Ga first and then depositing the GaAs together to make the (001) texture.

Apart from this specific (001) growth, there can be other type of texture which can be imparted using the present invention, that is, to employ a predominantly single atomic species prior to depositing a binary alloy or a tertiary alloy comprising predominantly two species. Some of the textures which can be imparted may be a (112) texture of NiAl or FeAl or similar materials. A perpendicular anisotropy can also be imparted for a Co alloy magnetic layer for application to a perpendicular magnetic recording. In this case, a Co(0002) texture of the magnetic layer is imparted from the combination of a thin single atomic species layer and a binary (or tertiary) alloy layer.

Moreover, although the embodiments described above use a rigid glass substrate, the present invention may similarly be applied to other kinds of substrates, such as metal, polymer, plastic and ceramic substrates which may be flexible or rigid, and still not depart from the spirit of the present invention.

In the case of a magnetic disk, mechanical circumferential texturing (texturing parallel to tracks) employed on top of NiP coated substrates are found to have much superior performance than that without such texturing, in terms of the signal-to-noise (S/N) ratio and in terms of thermal decay. Also, since the c-axis (<0001>) of Co grains with (11$\bar{2}$0) texture are oriented mostly along the circumferential direction in the case of the magnetic disk, this texturing is added advantage for the magnetic recording, because the head field is also applied along the circumferential direction during operation. It was found in the past that, mechanical texturing applied on the NiP coated substrates, imparts crystallographically alignment not only the magnetic layer, but also on the Cr alloy underlayers. Underlayers are grown with (002) texture both with and without mechanical texturing. However, for the former case, the Cr<110> direction is also preferably aligned towards the circumferential direction in the case of the magnetic disk. Therefore, the magnetic recording medium of the present invention would also show preferable underlayer and magnetic layer orientation due to either the mechanical texturing of the substrate or due to the mechanical circumferential texturing of the seed layer such as NiP or the seed layer according to the present invention.

Figure 18:
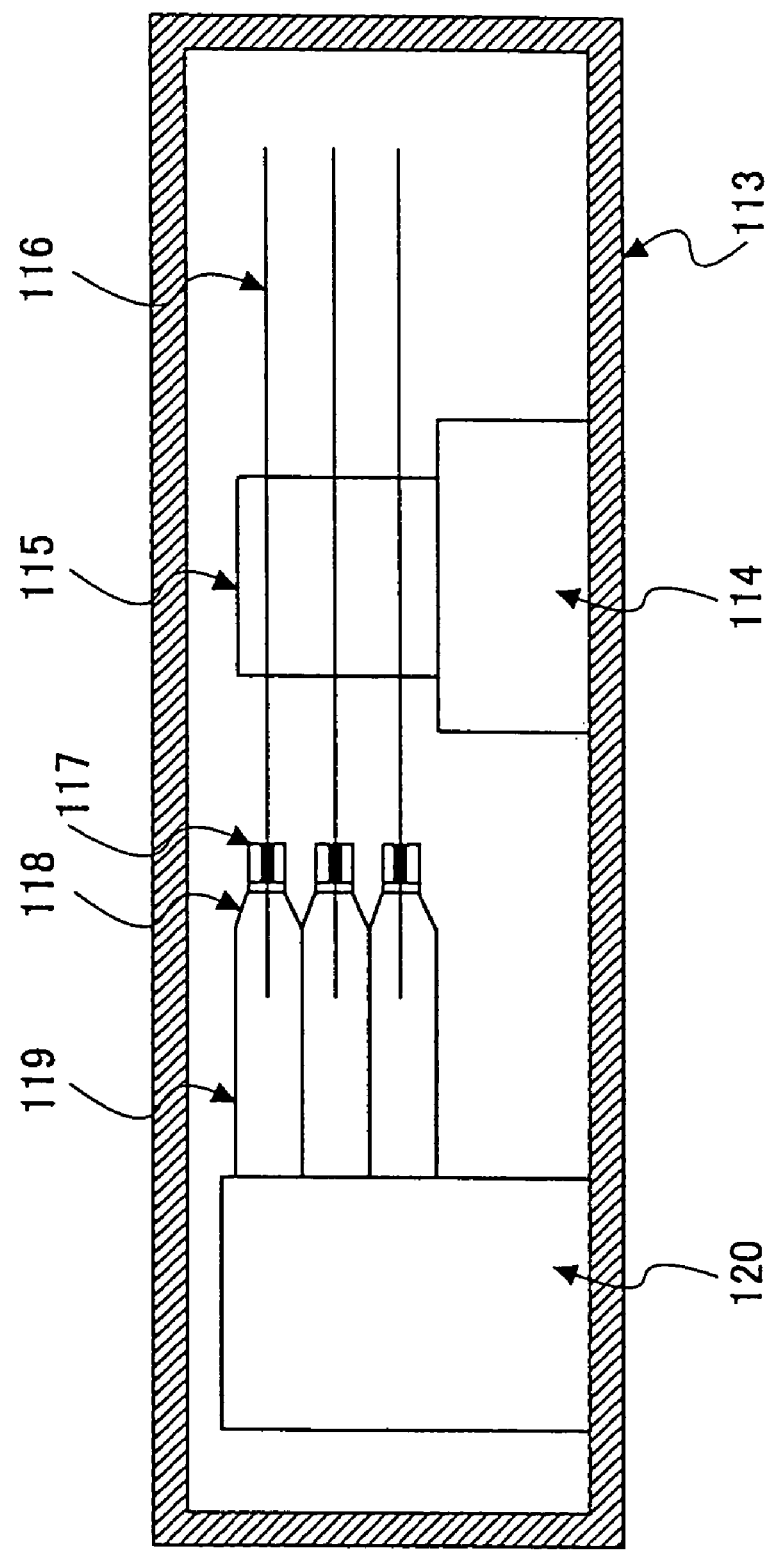
FIG. 18 is a cross sectional view showing an important part of this embodiment of the magnetic storage apparatus.

Next, a description will be given of an embodiment of a magnetic storage apparatus according to the present invention, by referring to FIGS. 18 and 19. FIG. 18 is a cross sectional view showing an important part of this embodiment of the magnetic storage apparatus, and FIG. 19 is a plan view showing the important part of this embodiment of the magnetic storage apparatus.

Figure 19:
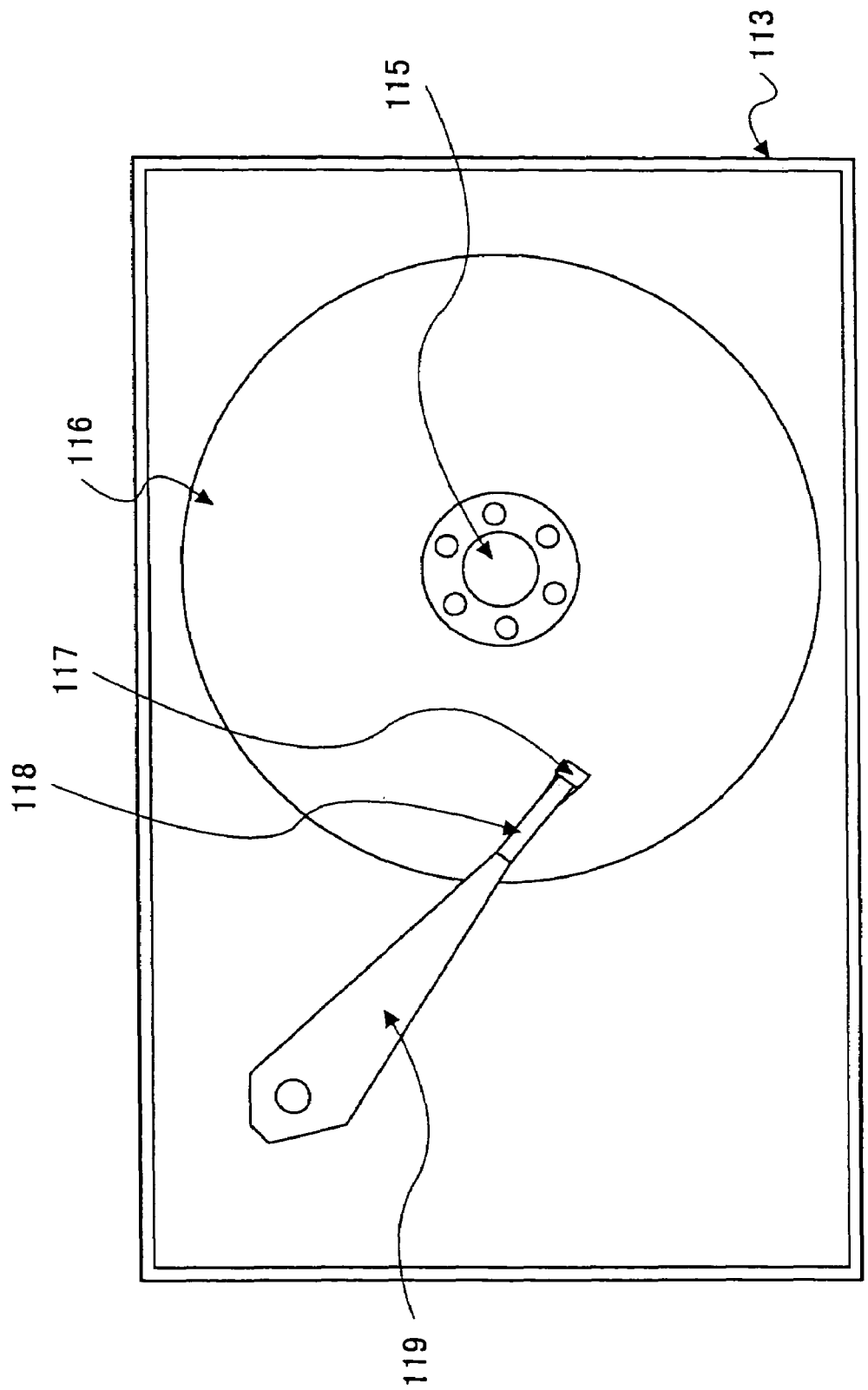
FIG. 19 is a plan view showing the important part of the embodiment of the magnetic storage apparatus.

As shown in FIGS. 18 and 19, the magnetic storage apparatus generally includes a motor 114, a hub 116, a plurality of magnetic recording media 116, a plurality of recording and reproducing heads 117, a plurality of suspensions 118, a plurality of arms 119, and an actuator unit 120 which are provided within a housing 113. The magnetic recording media 116 are mounted on the hub 115 which is rotated by the motor 114. The recording and reproducing head 117 is made up of a reproducing head such as a MR or GMR head, and a recording head such as an inductive head. Each recording and reproducing head 117 is mounted on the tip end of a corresponding arm 119 via the suspension 118. The arms 119 are moved by the actuator unit 120. The basic construction of this magnetic storage apparatus is known, and a detailed description thereof will be omitted in this specification.

This embodiment of the magnetic storage apparatus is characterized by the magnetic recording media 116. Each magnetic recording medium 116 has the structure of any of the embodiments described above described in conjunction with FIGS. 4 through 17. The number of magnetic recording media 116 is not limited to three and only two or four or more magnetic recording media 116 may be provided.

The basic construction of the magnetic storage apparatus is not limited to that shown in FIGS. 18 and 19. In addition, the magnetic recording medium used in the present invention is not limited to a magnetic disk, and the magnetic recording medium may take the form of a magnetic tape, a magnetic card or the like.

Therefore, according to the present invention, it is possible to reduce grain sizes of the underlayer and the magnetic recording layer, and promote desired orientation of the magnetic recording layer, by the provision of the seed layer. As a result, it is possible to realize a magnetic recording medium having an improved performance, even when the underlayer is formed using the multi-cathode system. Of course, when the single-cathode system is used to form the underlayer, the grain sizes of the underlayer and the magnetic recording layer can similarly be reduced to promote the desired orientation of the magnetic recording layer by the provision of the seed layer.

Further, the present invention is not limited to these embodiments, but various variations and modifications may be made without departing from the scope of the present invention.

What is claimed is:

1. A magnetic recording medium comprising:
    a substrate;
    a magnetic recording layer made of a Co alloy or a CoCr alloy;
    a seed layer disposed between the substrate and the magnetic recording layer; and
    an underlayer made of a group selected from one of RuAl, VAl, MnRh, IrAl and OsAl, and disposed between the seed layer and the magnetic recording layer,
    said seed layer is made of a material consisting only of one of the elements forming the binary alloy material of the underlayer.

2. The magnetic recording medium as claimed in claim 1, wherein said magnetic recording layer is made up of a single magnetic layer or a synthetic ferrimagnetic structure, said synthetic ferrimagnetic structure being made up of at least two antiferromagnetically coupled CoCr alloy magnetic layers, wherein c-axes of CoCr alloy magnetic layers are significantly parallel to a film plane thereof such that a ratio $h \leq 0.15$, where $h = Hc\perp/Hc$, $Hc\perp$ denotes perpendicular coercivity, and Hc denotes coercivity along the film plane.

3. The magnetic recording medium as claimed in claim 1, wherein when said underlayer is made of a material selected from a group consisting of RuAl, MnRh, IrAl and OsAl, the underlayer has approximately 40% to 60% composition ranges of one of the elements forming the binary alloy material.

4. The magnetic recording medium as claimed in claim 1, wherein said underlayer has a thickness of approximately 5 nm to 60 nm.

5. The magnetic recording medium as claimed in claim 1, wherein said seed layer has a thickness of approximately 0.5 nm to 50 nm.

6. The magnetic recording medium as claimed in claim 1, wherein a total thickness of said seed layer and said underlayer is in a range of approximately 30 nm to 60 nm.

7. The magnetic recording medium as claimed in claim 1, wherein said substrate is mechanically textured.

8. The magnetic recording medium according to claim 1, further comprising:
    a Cr—M lattice matching layer having a thickness of approximately 1 nm to 10 nm formed directly on said underlayer and disposed between said underlayer and said magnetic recording layer, where M is a material selected from a group consisting of Mo, Ti, V, and W of atomic proportion greater than or equal to 10%.

9. The magnetic recording medium as claimed in claim 8, further comprising:
    an interlayer made of a hcp structured CoCr alloy having a thickness of approximately 1 nm to 5 nm and disposed between said Cr—M lattice matching layer and said magnetic recording layer.

10. The magnetic recording medium as claimed in claim 1, further comprising:
    an interlayer made of a hcp structured CoCr alloy having a thickness of approximately 1 nm to 5 nm and disposed between said underlayer and said magnetic recording layer.

11. The magnetic recording medium as claimed in claim 1, further comprising:
    a lattice matching layer made essentially of Ru having a thickness of approximately 1 nm to 3 nm in direct contact with said magnetic recording layer and disposed between said underlayer and said magnetic recording layer.

12. A magnetic storage apparatus comprising:
    at least one magnetic recording medium comprising a substrate, a magnetic recording layer made of a Co alloy or a CoCr alloy, a seed layer disposed between the substrate and the magnetic recording layer, and an underlayer made of a group selected from one of RuAl, VAl, MnRh, IrAl and OsAl, and disposed between the seed layer and the magnetic recording layer, said seed layer being made of a material consisting only of one of the elements forming the binary alloy material of the underlayer; and
    a head which writes information on and/or reproduces information from the magnetic recording medium.

13. The magnetic storage apparatus as claimed in claim 12, wherein the underlayer of said magnetic recording medium is made of a material selected from a group consisting of RuAl, MnRh, IrAl and OsAl, the underlayer has approximately 40% to 60% composition ranges of one of the elements forming the binary alloy material.

14. The magnetic storage apparatus as claimed in claim 12, wherein said magnetic recording medium is a magnetic disk.

* * * * *

UNITED STATES PATENT AND TRADEMARK OFFICE
CERTIFICATE OF CORRECTION

| | | |
|---|---|---|
| PATENT NO. | : 7,264,892 B2 | Page 1 of 1 |
| APPLICATION NO. | : 10/936005 | |
| DATED | : September 4, 2007 | |
| INVENTOR(S) | : Antony Ajan | |

It is certified that error appears in the above-identified patent and that said Letters Patent is hereby corrected as shown below:

Title Page,

Item "(62) Related U.S. Application Data", insert the following information:

--Continuation of PCT/JP2002/009128; filed Sep. 6, 2002--.

Signed and Sealed this

Twenty-fourth Day of June, 2008

JON W. DUDAS
*Director of the United States Patent and Trademark Office*